United States Patent [19]

Borzym

[11] 4,108,029
[45] Aug. 22, 1978

[54] CUT-OFF DIE SET

[75] Inventor: Alexander Borzym, Dearborn, Mich.

[73] Assignee: Alpha Industries, Inc., Detroit, Mich.

[21] Appl. No.: 799,205

[22] Filed: May 23, 1977

[51] Int. Cl.² .................... B26D 1/56; B26D 3/16
[52] U.S. Cl. .................................. 83/54; 83/300;
83/310; 83/319; 83/385; 83/578; 83/917
[58] Field of Search ............... 83/34, 54, 300, 310,
83/319, 385, 454, 456, 578, 618, 697, 917, 926 H

[56] References Cited
U.S. PATENT DOCUMENTS

| 2,741,309 | 4/1956 | Czarnik | 83/319 X |
| 3,129,624 | 4/1964 | Auer | 83/319 X |

Primary Examiner—Willie G. Abercrombie
Attorney, Agent, or Firm—Krass & Young

[57] ABSTRACT

A cut-off die set is disclosed for use in a cut-off apparatus of the type in which continuous length of tubing or other elongated stock emanating from a tubing mill is severed into lengths as the tubing emanates from the tubing mill by means of a cut-off die set mounted within the cut-off apparatus. The cut-off die set is adapted to be clamped to the tube so as to move therewith during severing of the tubing by a ram operated cut-off blade descending vertically to shear the tubing. The present disclosure involves a improvement to a notching mechanism often included in such cut-off apparatus in which a horizontally reciprocated blade notches the upper portion of the tubing just prior to severing by the main cut-off blade so as to eliminate dimples in the severed tube cross section. The improvement lies in a different timing of the movement of the notching blade with respect to the motion of the main blade, coupled with a different configuration thereof, the improved notching mechanism consisting of a notching blade having a hook shaped cutting edge which is pulled from an initial position extending over the tube across the upper portion of the tubing in order to notch the same, with the notching blade returning to its initial position after severing by passing through the opening in the tube created by the main cut-off blade. This drastically reduces the velocity of the notching blade operating mechanism, improving wear on the blade and other movement parts as well as reducing the loads on the operating mechanism. In addition it eliminates the blade drag normally associated with withdrawal of the notching blade prior to severing of the tubing section as occurs in conventional designs.

16 Claims, 5 Drawing Figures

CUT-OFF DIE SET

BACKGROUND OF THE INVENTION

1. Field of the Invention

This invention concerns tubing cut-off apparatus of the type used to sever continuously emanating lengths of tubing or other elongated stock continuously emanating from a mill in which the cut-off apparatus includes a cut-off die set operated by a swinging ram, which die set is caused to be clamped to the tubing during the severing operations in the apparatus, the severing of the tubing being carried out by a vertically reciprocating cut-off blade. More particularly, the present invention is drawn to an improvement in the notching mechanism which has been utilized in the past in conjunction with such cut-off die sets to notch the upper periphery of the tubing just prior to severing by the main cut-off blade. This eliminates the need for subsequent reshaping of the tube to eliminate dimpling which tends to occur in the absence of such pre-notching.

2. Description of the Prior Art

In cut-off die sets of the type described above, there is often included a pre-notching mechanism in which a notching blade is reciprocated across the upper periphery of the tubing after the tubing is clamped within the die set clamping jaws and just prior to descent of the main cut-off blade. The pre-notching eliminates the cusping or dimpling of the tubing to a large extent to the point that subsequent reshaping of the tubing ends of the severed length of tubing will not be normally required. While this expedient does accomplish its intended purpose, the designs heretofore used have certain weaknesses. Firstly, the mechanism operates by reciprocating the notching blade to and fro across the upper periphery of the tubing just prior to descent of the main cut-off blade. Since only a short time interval is available during which the tubing is clamped within the die set and since the notching blade must be removed from the path of the descending main cut-off blade, the movement of the notching blade is necessarily very rapid. These mechanism have in the past involved the use of cams and cam followers to obtain the reciprocal movement and this very rapid movement has contributed in no small part to the rate of wear of these cam mechanisms. In addition, these rapid part velocities have a tendency to create failures of parts due to the shock loading and the high stress levels which may result.

A further problem is created by the high velocity of the notching blade inasmuch as this creates considerable heating of the notching blade, in turn leading to relatively rapid wear thereof.

The blade wear problem is further excacerbated by the situation which requires the notching blade to first traverse the tubing during the notching operation and then to be withdrawn across the upper surface of the tube periphery. During the notching stroke, the forces involved necessarily produced substantial deflection of the tubing and blade such that a sufficient clearance space is not created by the notching operation so as to allow drag free withdrawal of the notching blade. That is, as the blade withdraws, the deflection forces involved having been relieved, the tubing relaxes reducing the clearance space so as to create drag forces between the tubing notch and the notching blade, as it returns, thus further contributing to power losses in the machine, as well as the further degredation in blade life.

In addition the high part velocities involve the respective parts increases the sizing of the parts required, bearing design specifications, etc., increasing the manufacturing cost of the mechanism.

Accordingly, it is an object of the present invention to provide a cut-off die set of the sort described including a tube notching mechanism which increases the cycle time available for notching operation of the mechanism.

It is a further object of the present invention to provide such a cut-off die set in which the notching blade velocity during the notching pass is substantially reduced over the designs heretofore utilized.

It is yet another object of the present invention to provide a notching mechanism which eliminates the blade withdrawal drag to further enhance blade wear life.

It is still a further object of the present invention to provide a notching mechanism therefore which operates at substantially reduced part velocities to thereby decrease the wear on the operating mechanism and also reduce the failure rate of the notching blade operating mechanism.

SUMMARY OF THE INVENTION

These and other objects which will become apparent upon a reading of the following specifications and claims, is accomplished by a notching blade configuration which is hooked so as to be able to be positioned in an initial position extending over the top of the tube periphery, with the tubing passing beneath to allow the notching blade to be drawn or pulled across the upper periphery of the tubing to notch the same. The notching blade then returns to the initial position after the cut-off blade has severed the tubing length and withdrawn to its initial position by passing between the opening created by the shearing action of the main cut-off blade. Since the notching blade need only make one pass prior to descent of the main cut-off blade, its velocity can be reduced over those designs involving a notching pass and return prior to descent of the main cut-off blade. In addition, the cut-off blade does not return to its initial position through the notch created by the notching blade, but rather through the opening created by the main cut-off blade to eliminate the blade drag problem described above. The resulting reduced velocities allow reduced wear on the notching blade operating mechanism and also the incidence of failure thereof. The specific design of the notching blade operating mechanism involves a cam and cam follower operated by the die set as the die set is reciprocated within the cut-off ram, as the ram reciprocates from its open to its shut position and back to its open position. The blade and blade holder are pivotally mounted to allow the notching blade to swing clear of the tubing during the return stroke in the event the notching blade becomes misaligned with the opening created by the main cut-off blade.

DETAILED DESCRIPTION

Figure 1:
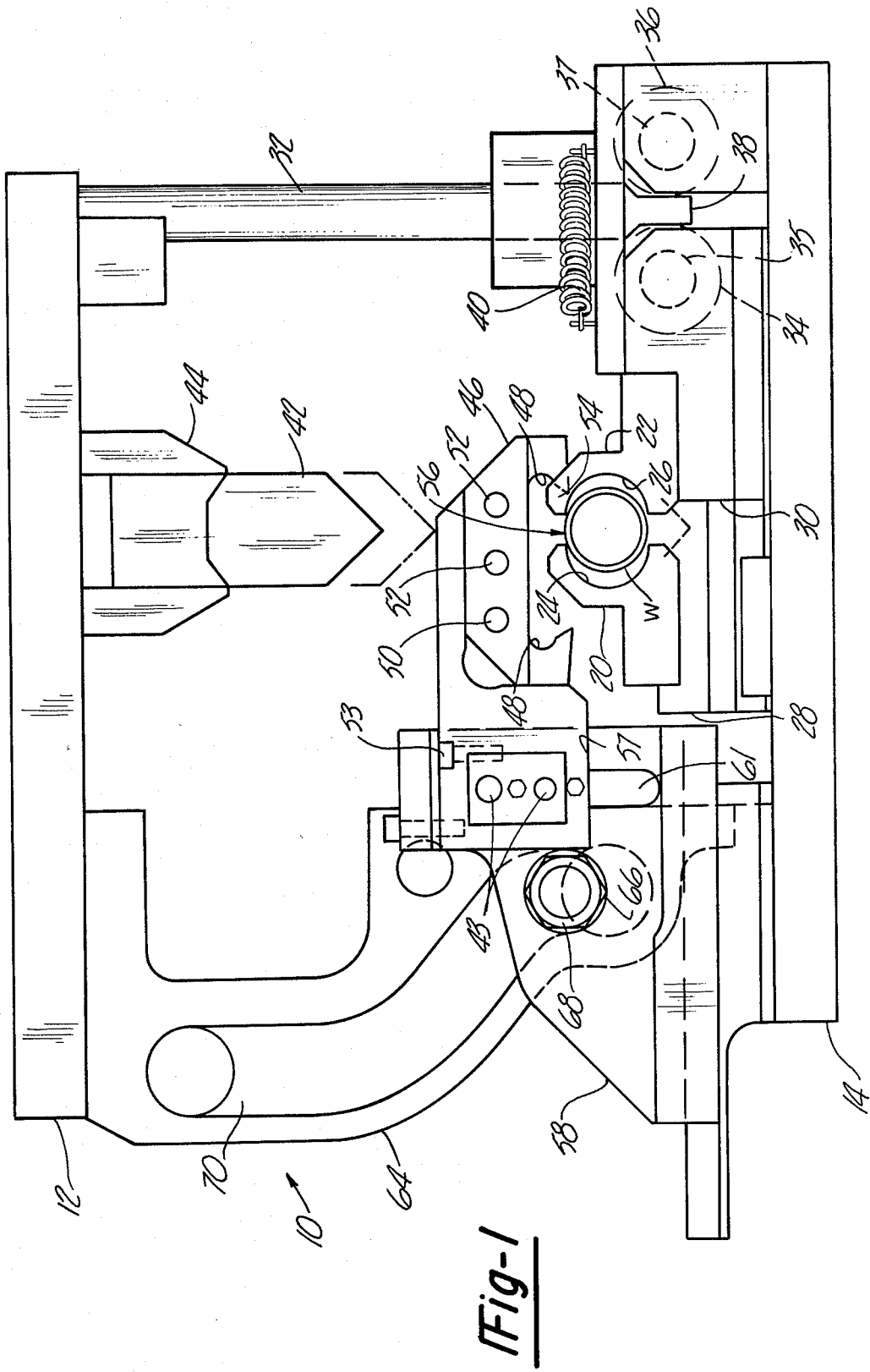
FIG. 1 is a front elevational view of a cut-off die set according to the present invention.

In the following specification and claims specific terminology is utilized in the interests of clarity and a particular embodiment described in accordance with the requirements of 35 USC 112, but it is to be understood that the same is not intended to be limiting, as indeed the invention is capable of many variations within the scope of the appended claims.

Referring to the drawings, the die set 10 according to the present invention, is depicted. As is well known by those skilled in the art, the cut-off die set 10 is adapted to be mounted within a cut-off apparatus within which the cut-off die set is mounted so as to be slidable along a rail set disposed within the cut-off apparatus. The cut-off apparatus normally includes a swinging or reciprocating ram mechanism which serves to operate the cut-off die set 10. Die sets of the general type with which the present invention is concerned operate by the ram mechanism first causing the clamping jaws within the jaw set to be operated to clamp the die set to the rapidly moving typing section, the cut-off apparatus being positioned to receive the elongated stock as it emanates from the processing fabrication mill. The die set, being clamped to the moving tube, moves together with the tube along a rail set provided in such apparatus. The ram mechanism then causes the main cut-off blade to be reciprocated so as to shear off a slug from the tube section clamped within the die set to sever a length from the moving tube. This cut-off operation, as described above, is often preceded with a notching operation, and if this is the case, the notching mechanism is first operated prior to reciprocation of the main cut-off blade. The ram mechanism then operating in reverse manner, first causes retraction of the cut-off blade and then unclamping of the die set from the tube section, as the cut-off die set approaches the end of its travel on the rail set, to allow the tubing to advance through the die set, a return mechanism returning the die set to its initial position on the rail set preparatory to initiation of a new cycle.

Inasmuch as such apparatus and these features of that apparatus are now very well known in the art, a complete description of the same is not deemed here necessary for a proper understanding of the improved die set according to the present invention. Thus, the die set 10 according to the present invention, includes an upper die shoe 12 which is adapted to be secured to the ram operating mechanism with a lower die shoe 14 adapted to be received within the rail set of the cut-off apparatus. The upper die shoe 12 and lower die shoe 14 are mounted to allow reciprocatory motion toward and away from each other upon operation of the ram operating mechanism. To guide the upper die shoe 12 and the lower die shoe 14 in this movement, mating sets of guide post bushings 16 and guide posts 18 are affixed, respectively, to the upper die shoe 12 and lower die shoe 14 with the guide post 18 being slidable in the guide post bushings 16. These elements are omitted in the view of FIG. 1 in order to simplify that view. The workpiece W, shown as a tubing section in FIG. 1, is caused to be clamped to the die set 10 by means of a pair of die jaws 20 and 22, each having a complementary inner radius contour 24 and 26, respectively, which is complementary to the tubing diameter when the clamping jaws 20 and 22 are caused to advance towards each other so as to engage the workpiece W. The reciprocal movement of the die jaws 20 and 22 is produced by sliding movement of an upper die jaw holder 28 and a lower die jaw holder plate 30 slidable on each other. The die clamping jaws 20 and 22 are adapted to be reciprocated towards and away from each other in proper synchronism with the movement of the upper die shoe 12 and lower die shoe 14 toward and away from each other, by a die jaw clamping cam 32 affixed to the upper die shoe 12. The die jaw cam 32 passes between a pair of clamping rollers 34 and 36 carried by the upper die jaw holder 30 and lower die holder 28, respectively. The die jaw clamping cam 32 has a reduced end portion 38 formed thereon, the net result being the camming outwardly of the die jaw rollers 34 and 36 mounted to roll shafts 35 and 37, respectively, to move outwardly to move the clamping jaws 20 and 22 together.

Thus, it can be seen from FIG. 1 that the clamping jaws 20 and 22 will be forced together by virtue of the die jaw rollers 34 and 36 being forced apart, except at the extreme uppermost position of the upper die shoe 12 and lower die shoe 14. It can be appreciated that this will produce proper synchronism of the clamping with the operation of the die set 10, since the clamping jaws will be initially operated to clamp the die set 10 to the tubing W at the initiation of each cycle, and will be released at the end of each cut-off cycle. A spring bias provided by a closing-opening spring 40 is provided with one end secured to each of the upper die jaw holder 30 and lower die jaw holder 28, respectively.

A main cut-off blade 42 is provided which is mounted within a blade holder assembly 44, in turn secured to the upper die shoe 12. The die jaws 20 and 22 are slotted transversely to the tube W axis to provide a clearance space through which the main cut-off blade 42 will pass upon the ram operating mechanism reciprocating the upper die shoe 12 downwardly sufficiently to pass through the plane of the tube W, all of which parts of this apparatus are now well known to those skilled in the art, inasmuch as cut-off die sets having clamping jaws and main cut-off blades of this configuration have been utilized in the past.

The notching mechanism, according to the improved version of the present invention, features a notching blade 46 having a cutting edge 48 which is reversely extending, i.e., hooked-shaped, a cutting edge 48 being provided on either side of the notching blade 46, so as to be reversible to lengthen the time between sharpenings thereof.

Figure 4:
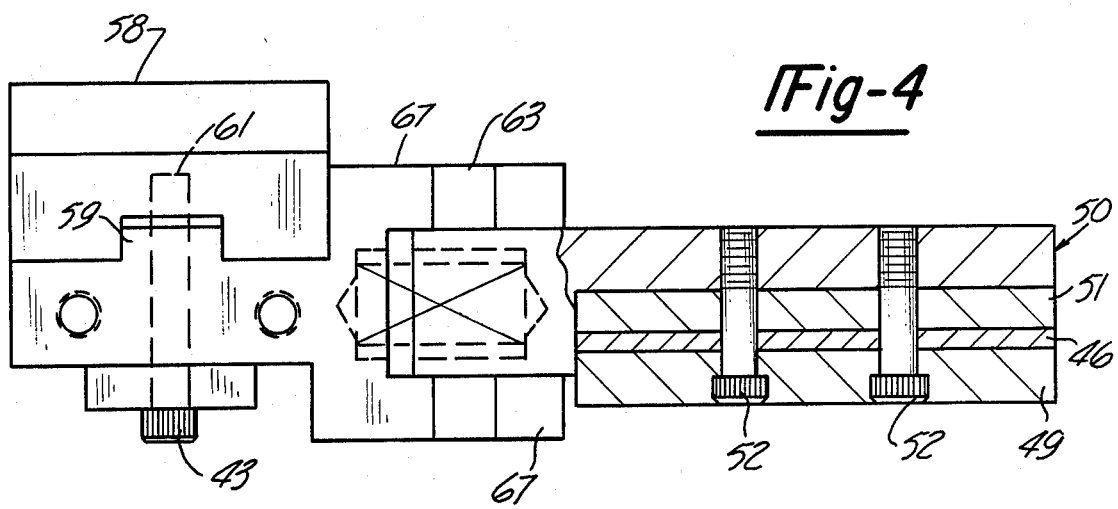
FIG. 4 is a plan view of the blade and holder mounting arrangement shown in FIG. 1.

The notching blade 46 is mounted to a notching blade holder 50 which securely retains the notching blade length by virtue of a plurality of cap screws 52 passing through the notching blade spacer plates 49 and 51, the notching blade 46, and threadably received into the holder 50 as shown in FIG. 4. The holder 50 is secured to a cross slide 58 to be described below by means of a pair of capscrews 53 and 55 passing through and engaging the undersurface of the section 57 of the cross slide 58 and serving to vertically locate the holder 50. A key 59 formed on the holder 50 mates with a similar slot 61 formed in the cross-slide 58 to resist blade reactions during the notching strokes. Slot 61 extends vertically to allow adjustment by capscrews 53 and 55 and also by alternate positioning of a pair of capscrews 43 in a hole pattern arranged in the slot 61, the capscrews 43 passing through holes in a retainer plate 45.

A pivot pin 63 allows limited articulation between holder plate 65 carrying the notching blade 65 and holder clevis member 67 to the extent allowed by clearance space 69 against the bias of a return spring 71. This allows the notching blade 46 to move clear of the tube W during the return stroke if interference exists due to shifting of the tube W and dieset during the cut-off cycle.

The notching blade holder 50 positions the notching blade 46 and an initial position at the beginning of the cut-off cycle, the notching blade 46 extending over the tube W with the cutting edge 48 positioned below the upper periphery 56 of the tube W. Thus, the hooked shape of the cutting edge 48 provides a clearance space beneath which the tube may pass.

Figure 2:
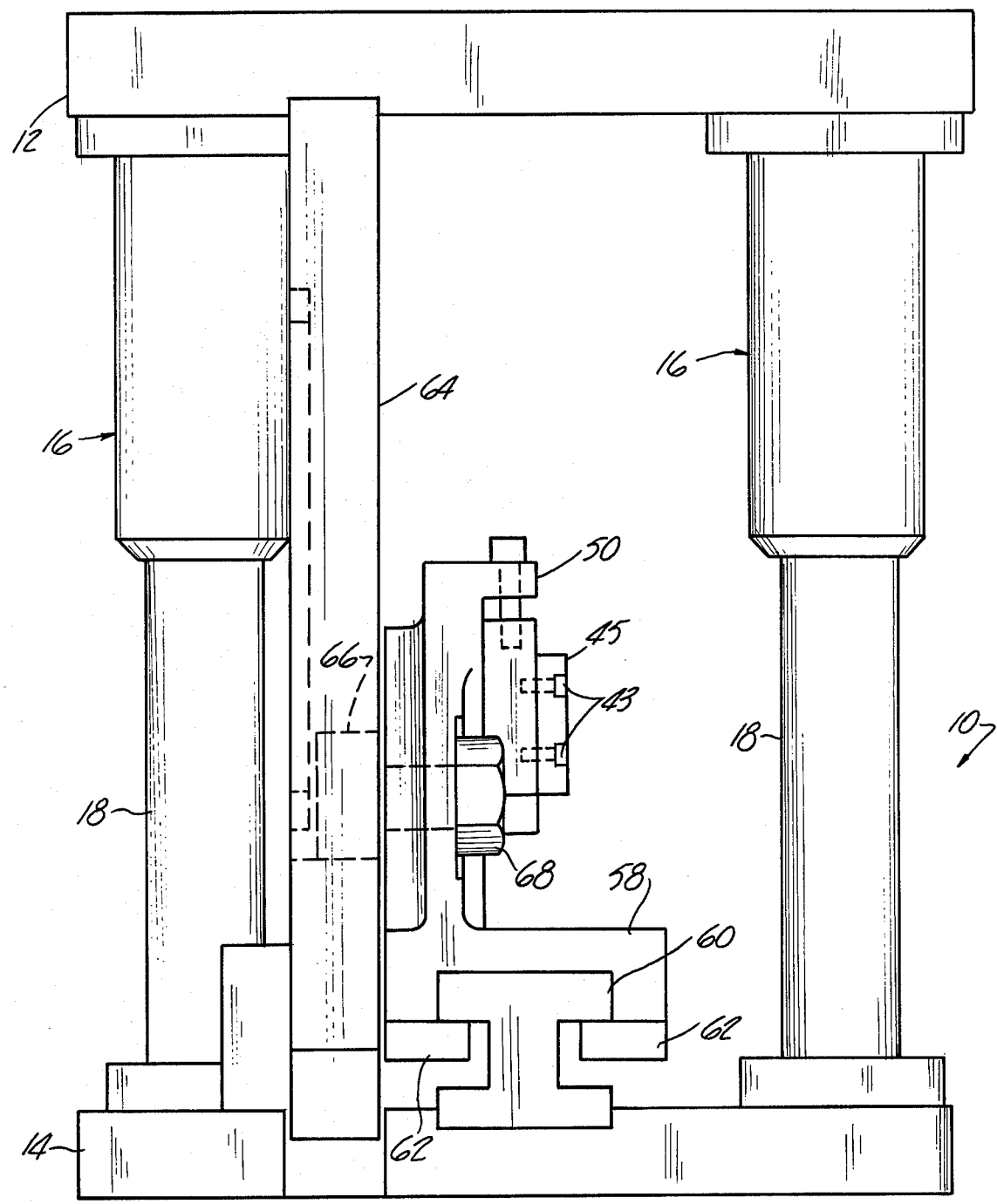
FIG. 2 is a side elevational view of the cut-off die set, shown in FIG. 1.
Figure 3:
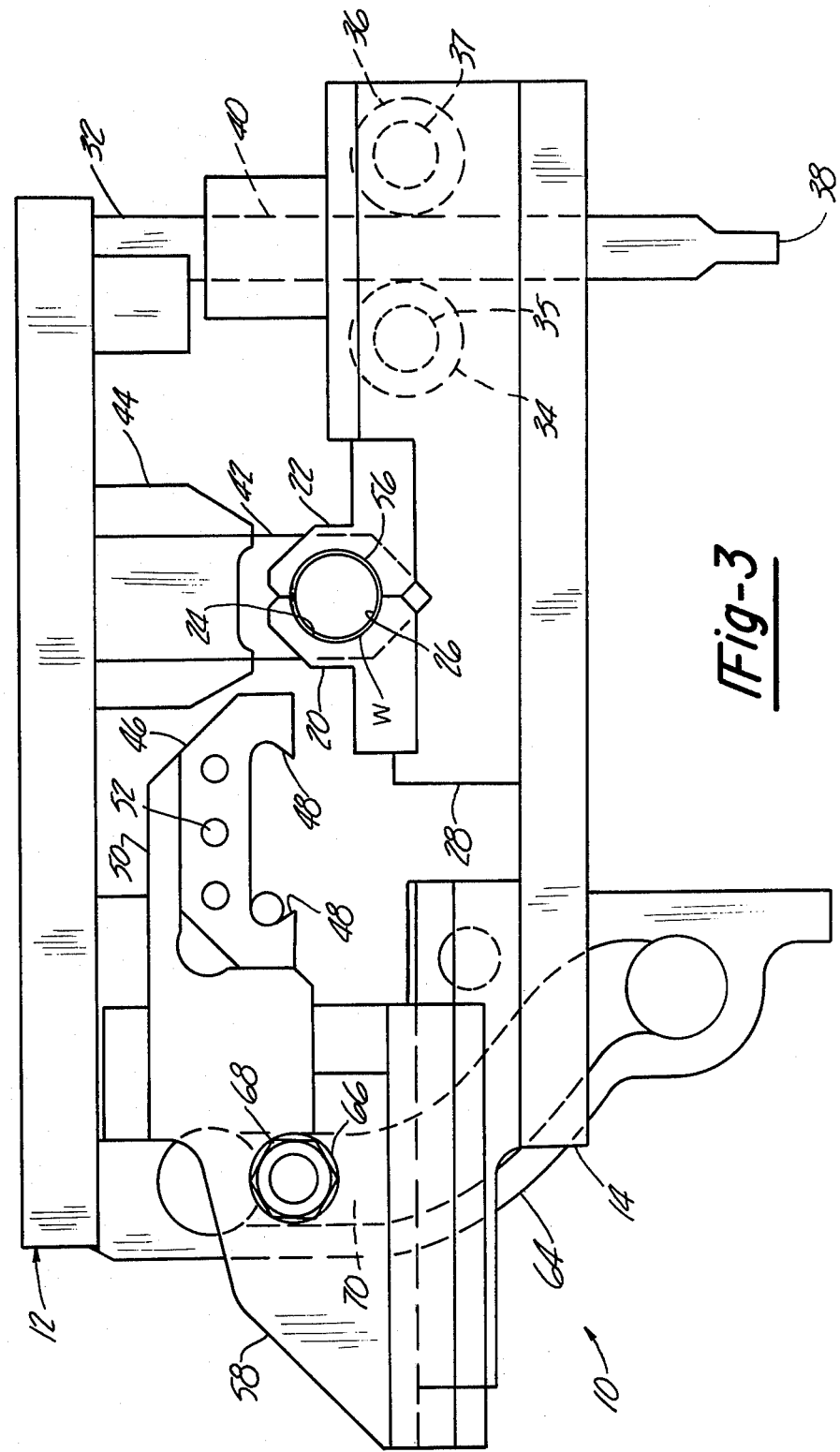
FIG. 3 is a front elevational view of a cut-off die set, as shown in FIG. 1, shown with the main cut-off blade in the advanced position.

The notching blade 46 performs its notching operation by being drawn to the left or pulled across the axis of the tube W in a single stroke. This cross movement is produced by a cross slide 58 mounted for reciprocating movement on a cross slide rail 60 fastened to the lower die shoe 14, as seen in FIG. 2, the cross slide 58 being retained thereon by a pair of gibs 62. Reciprocation of the cross slide 58 is induced by interaction with a cam guide 64 interacting with a cam roller 66 mounted to the cross slide 50 to be drawn to the left, as viewed in FIG. 1, upon initial downward movement of the upper die shoe 12 sufficient to complete engagement of the die clamping jaws 20 and 22 with the tube W, so as to cause the notching blade 46 to be drawn across the tube W and notch its upper periphery thereof through its wall section until reaching the position shown in FIG. 3. The notching blade 46 is then held in this position until the upper die shoe 12 has descended allowing the main cut-off blade 42 to completely sever the tube W upon initial upper movement of the upper die shoe 12 sufficient to allow movement of the main cut-off blade 42 out of the path of the notching blade 46. At this point, while the die jaws 20 and 22 are still in engagement with the tube W and the die set 10 is moving together with the tubing sections, the notching blade 46 is returned to its initial position by reciprocation of the cross slide 50 through the opening created by the main cut-off blade 44 having sheared a slug from the tubing section until the initial position, shown in FIG. 1, is again attained.

The die jaws 20 and 22 clamp a portion of the length of the tubing W on either side of the point at which severing takes place, so that after cut-off, the tubing sections are maintained in position to allow the notching blade 46 to return.

The die set clamping jaws 20 and 22 are then released by virtue of the reduced diameter end portion 38 coming into registry with the cam rolls 34 and 36 allowing the opening spring 40 to separate the clamping jaws 20 and 22 and releasing the tubing sections so that relative movement between the tube stock and the die set 10 again occurs and the die set 10 is returned to its initial position in the cut-off apparatus, the hooked-shaped blade 46 thus allowing clearance for the tube to pass beneath the blade during this relative movement which prior to initiation of another cut-off cycle.

It can be seen that the object of the present invention has been achieved by this arrangement, since the notching of the tube W takes place as single stroke as it is drawn across the upper periphery of the tube. The single stroke takes place in the same fraction of the ram cycle as normally required for the notching mechanism to double stroke across the tube periphery, i.e., that portion of the cycle between the clamping of the die set to the tube W and the descent of the main cut-off blade 44 to a point approaching the tube W for cut-off of the tube W. This allows the velocity of the cross slide to be halved over that of the double stroke notching, as per conventional design, saving blade wear and tear on the cross slide and rails and cam guide elements of the notching mechanism, and also reducing the incidence of failure due to the reduction in stress levels. Also, this same reduction in stress levels allows the components to be designed to lower design stresses saving in the manufacturing costs involved. Since the return stroke is by virtue of the through the clearance provided by the removal of the slug of tube created by the shearing action of the main cut-off blade 44, the notching blade 46 encounters no drag or wear. Since there is no contact with the tube W during this return stroke, since the tube remains securely clamped to the die set 10 during this return, no alignment problems are created and the notching mechanism simply returns the notching blade 46 to its initial position. The hooked shape of the blade allows the draw or pull type notching and also allows a clearance space for the tube to pass beneath the blade during the reciprocation of the die set 10 to its initial position with the tube moving relative to the die set during this segment of the cut-off cycle. All of this has been achieved, it can be seen, by a relatively simple, fail-safe design having a minimum number of parts and a minimum change in the other components of the die set over conventional design, with a great improvement in the performance aspects of the die set, described above.

Figure 5:
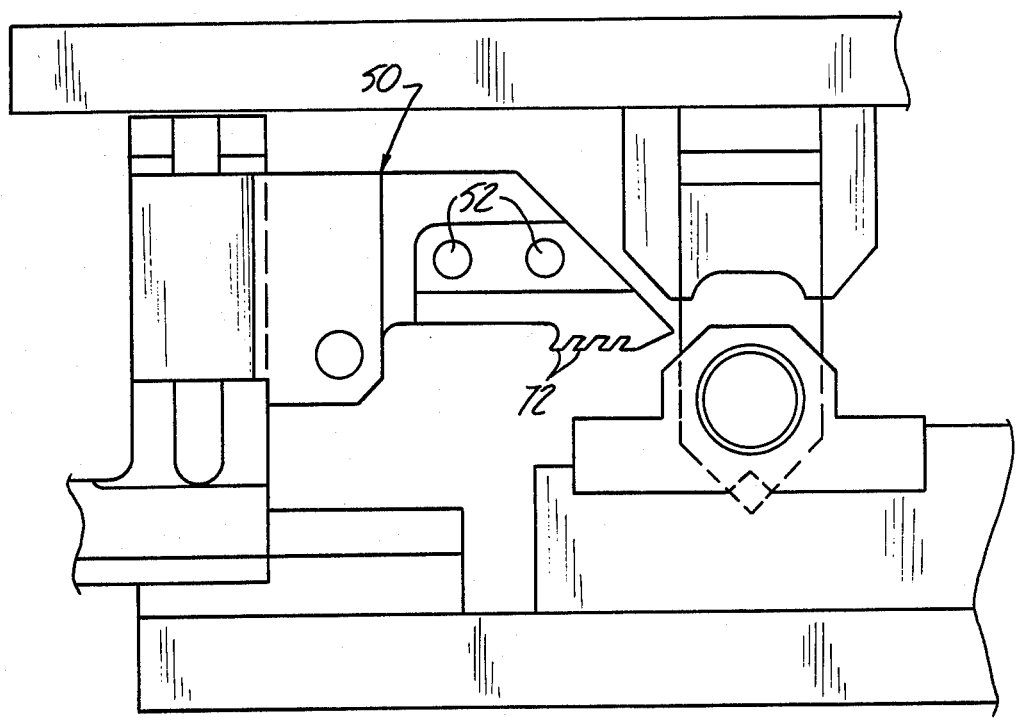
FIG. 5 is an elevational view of a notching blade of an alternate configuration to the notching blade shown in FIGS. 1-4 installed in a blade holder.

Referring to FIG. 5, an alternate notching blade configuration is shown. In this embodiment the notching blade 72 has a body portion 74 and an end portion 76 extending therefrom formed with a plurality of reversely extending cutting edges 78 provided, which progressively extend away from the end portion 76, i.e., downward to a greater degree away from the body portion. This creates a progressive notching action, akin to a broaching cut, to provide a cleaner notch and further minimize the tube deformation produced by the cut-off operation. This broach type cutting is made possible by the "pull" notching stroke.

The embodiments of the invention in which an exclusive property or privilege is claimed are defined as follows:

1. A cut-off die set for use in an elongated stock cut-off apparatus of the type including a ram mechanism for operating said cut-off die set, said die set comprising:

clamping means adapted to be operated by said ram mechanism clamping said die set to said stock;

a main cut-off blade, and means operated by said ram mechanism causing said main cut-off blade to move to sever said stock after said clamping means clamps said die set to said stock;

notching means for notching said stock periphery prior to said severing by said main cut-off blade at the point on said stock at which said severing is initiated, said notching means including: a notching blade, means producing notching of said stock by drawing said notching blade across said stock prior to said severing of said stock by said main cut-off blade;

means repositioning said notching blade in said initial position after said main cut-off blade has severed said stock at said notching point, whereby said notching and return strokes of said notching blade occur before and after respectively of said severing movement of said main cut-off blade.

2. The die set according to claim 1 wherein said notching blade includes a cutting edge portion of hooked-shaped configuration and wherein said means drawing said notching blade across said tubing section includes a notching blade holder positioning said notching blade extending over said tube with the hooked portion of said notching blade positioned to notch said stock upon being drawn across said stock.

3. The die set according to claim 1 wherein in said means positioning said notching blade includes means causing said notching blade to pass through said stock in the region of said severing of said stock by said main cut-off blade passing through the opening created by said main cut-off blade, whereby said notching blade passes through said clearance.

4. The die set according to claim 1 wherein said die set includes an upper die shoe drivingly connected to said ram operating mechanism and a lower die shoe mounted stationary relative said upper die shoe, whereby said upper die shoe is reciprocated towards said lower die shoe and means for operating said clamping means and said main cut-off blade and said notching means in response to said reciprocation of said upper die shoe towards said lower die shoe by said ram mechanism.

5. The die set according to claim 4 upon said notching means includes a cross slide member and means for reciprocating said cross slide member across the axis of said stock and said clamping means.

6. The die set according to claim 5 wherein said means for reciprocating said cross slide includes a cam and cam follower connected respectively to said upper die shoe and said lower die shoe causing said transverse reciprocation of said cross slide.

7. The die set according to claim 6 wherein said cam and cam guide follower include means to produce reciprocation of said cross slide to cause said notching blade to extend across said tube just prior to release of said clamping means by reciprocation of said upper die shoe and lower die shoe to their extreme most position.

8. The die set according to claim 7 wherein said cam and cam guide means includes means to produce reciprocation of said cross slide away from said stock upon reciprocation of said upper die shoe toward said lower die shoe just after clamping means has been operated by reciprocation of said upper die shoe and towards said lower die shoe.

9. The die set according to claim 1 further including mounting means mounting said notching blade for limited movement, allowing said notching blade to be displaced clear of said stock during said return stroke.

10. The die set according to claim 9 wherein said mounting means includes means allowing pivoting movement of said notching blade away from said stock.

11. The die set according to claim 2 wherein said hook-shaped notching blade includes a plurality of cutting edges formed thereon, said cutting edges extending progressively further into said stock along the direction of movement to produce a progressive notching cut.

12. A method of severing lengths of elongated stock, such as tubing comprising the steps of positioning a notching blade extending across said stock; drawing said notching blade across said stock so as to notch the outer periphery thereof; severing said stock by a cut-off blade shearing said stock at said notched point on said stock; withdrawing said cut-off blade; repositioning said notching blade extending across said stock, whereby said notching is carried out by a drawing movement to be clear of said stock after said notching stroke.

13. The method according to claim 12 wherein said repositioning step, said notching blade is passed through the opening between said severed stock lengths created by said cut-off blade, whereby said notching blade does not contact said stock during said repositioning step.

14. The method according to claim 13 further including the step of clamping said stock for a portion of its length prior to said notching or severing steps, and wherein said notching and severing steps take place intermediate said clamp length, whereby said severed segment may be maintained and positioned during said severing and clamping steps, thereby allowing said repositioning of said notching blade.

15. The method according to claim 13 wherein said notching blade has a hooked configuration allowing said notching blade to be drawn along a linear path across said stock to produce said notching.

16. The method according to claim 15 wherein said hooked blade is formed with a plurality of cutting edges and said method includes the step of carrying out said notching by progressively engaging said stock with said plurality of cutting edges.

* * * * *

Disclaimer 4,108,029.—*Alexander Borzym, Dearborn, Mich.* CUT-OFF DIE SET. Patent dated Aug. 22, 1978. Disclaimer filed May 4, 1983, by the assignee, *Alpha Industries, Inc.*

Hereby enters this disclaimer to claim 12 of said patent.

[*Official Gazette July 12, 1983.*]

REEXAMINATION CERTIFICATE (295th)
United States Patent [19]

Borzym

[11] B1 4,108,029

[45] Certificate Issued Jan. 1, 1985

[54] CUT-OFF DIE SET

[75] Inventor: Alexander Borzym, Dearborn, Mich.

[73] Assignee: Alpha Industries, Inc., Detroit, Mich.

Reexamination Request:
No. 90/000,410, Jun. 23, 1983

Reexamination Certificate for:
Patent No.: 4,108,029
Issued: Aug. 22, 1978
Appl. No.: 799,205
Filed: May 23, 1977

Disclaimer of claim(s) filed May 4, 1983 (1032 O.G. 14)

[51] Int. Cl.³ .................... B26D 1/56; B26D 3/16
[52] U.S. Cl. ............................ 83/54; 83/300; 83/310; 83/319; 83/385; 83/578; 83/917
[58] Field of Search ............ 83/34, 54, 300, 310, 83/319, 385, 454, 456, 578, 618, 697, 917, 926 H, 169

[56] References Cited
U.S. PATENT DOCUMENTS

| | | | |
|---|---|---|---|
| 2,741,309 | 4/1956 | Czarnik | 83/319 X |
| 2,879,844 | 3/1959 | Tuttle | 83/169 |
| 3,129,624 | 4/1964 | Auer | 83/319 X |

*Primary Examiner*—Willie G. Abercrombie

[57] ABSTRACT

A cut-off die set is disclosed for use in a cut-off apparatus of the type in which continuous length of tubing or other elongated stock emanating from a tubing mill is severed into lengths as the tubing emanates from the tubing mill by means of a cut-off die set mounted within the cut-off apparatus. The cut-off die set is adapted to be clamped to the tube so as to move therewith during severing of the tubing by a ram operated cut-off blade descending vertically to shear the tubing. The present disclosure involves a improvement to a notching mechanism often included in such cut-off apparatus in which a horizontally reciprocated blade notches the upper portion of the tubing just prior to severing by the main cut-off blade so as to eliminate dimples in the severed tube cross section. The improvement lies in a different timing of the movement of the notching blade with respect to the motion of the main blade, coupled with a different configuration thereof, the improved notching mechanism consisting of a notching blade having a hook shaped cutting edge which is pulled from an initial position extending over the tube across the upper portion of the tubing in order to notch the same, with the notching blade returning to its initial position after severing by passing through the opening in the tube created by the main cut-off blade. This drastically reduces the velocity of the notching blade operating mechanism, improving wear on the blade and other movement parts as well as reducing the loads on the operating mechanism. In addition it eliminates the blade drag normally associated with withdrawal of the notching blade prior to severing of the tubing section as occurs in conventional designs.

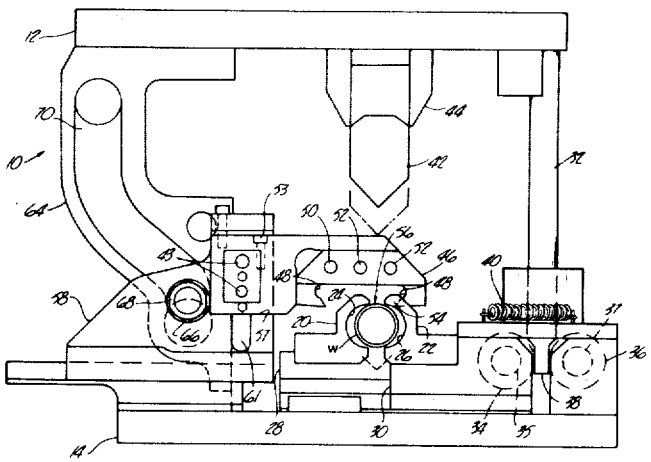

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 12 was previously disclaimed.

Claim 4 is cancelled.

Claims 1, 2, 5 and 13 are determined to be patentable as amended.

Claims 3, 6–11 and 14–16, dependent on an amended claim, are determined to be patentable.

1. A cut-off die set for use in an elongated stock cut-off apparatus of the type including a ram mechanism for operating said cut-off die set, said die set comprising:
   an upper die shoe;
   a lower die shoe;
   guide means interconnecting the upper and lower shoes for reciprocal motion therebetween;
   clamping means [adapted to be operated by said ram mechanism] *comprising a pair of clamping jaws on said lower shoe; cam means depending from said upper shoe for directly and positively actuating said jaws as a result of motion of said upper shoe relative to said lower shoe for* clamping said die set to said stock;
   a main cut-off blade, [and means operated by said ram mechanism causing said main cut-off blade to move] *carried by said upper shoe* to sever said stock after said clamping means clamps said die set to said stock;
   notching means for notching said stock periphery prior to said severing by said main cut-off blade at the point on said stock at which said severing is initiated, said notching means including:
   a notching blade, *slide* means [producing notching of said stock by] *for reciprocally* drawing said notching blade *from an initial position through a notching stroke* across said stock prior to said severing of said stock by said main cut-off blade *and returning* [means repositioning] said notching blade [in] *to* said initial position *through the same path as the notching stroke and normally without change in attitude* after said main cut-off blade has severed said stock at said notching point, [whereby said notching end return strokes of said notching blade occur before and after respectively of said severing movement of said main cut-off blade] *and means mechanically connecting said slide means to said upper shoe for positively driving the slide means only in the notching stroke direction as the upper shoe descends towards said lower shoe and for positively driving the slide means only in the return direction as the upper shoe ascends reciprocally away from said lower shoe.*

2. The die set according to claim 1 wherein said notching blade includes a cutting edge portion of hooked-shaped configuration and wherein said means drawing said notching blade across said tubing section includes a notching blade holder positioning said notching blade extending over said tube with the hooked portion of said notching blade positioned to notch said stock upon being drawn across said stock[.], *said notching blade being secured to said blade holder above and ahead of the hooked portion in the direction of said notching stroke to load the blade in shear during the notching stroke.*

5. The die set according to claim [4 upon said notching means includes a cross slide member and means for reciprocating said cross slide member across the axis of said stock and said clamping means.] *1 wherein said main cut-off blade exhibits a relatively sharp point defined by the intersection of two angled entry edges, said slide means having a distal edge the surface of which lies at an angle substantially parallel to the proximate entry edge of said cut-off blade.*

13. [The method according to claim 12] *A method of severing lengths of elongated stock such as tubing in a movable independent die set comprising relatively reciprocal upper and lower die components wherein the upper component carries a cut-off blade and the lower component carries a pair of clamping jaws for said stock comprising the steps of:*
   *positioning a notching blade on a cross slide which extends across the stock between the upper and lower die components;*
   *powering the upper component toward the lower component;*
   *driving the cross slide across the periphery of the stock directly from movement of the upper component so that the notching blade cuts a notch in the periphery of the stock and clears the path of the cut-off blade as the cut-off blade enters the plans of notching blade cross slide movement;*
   *simultaneously positively driving the clamping jaws directly off the upper die component;*
   *powering the upper component away from the lower component;*
   *unclamping the stock; and*
   *repositioning the notching blade by simultaneously powering the cross slide off of the upper component back toward the initial position* [wherein] *where in* said repositioning step, said notching blade is passed through the opening between said severed stock lengths created by said cut-off blade, whereby said notching blade does not contact said stock during said repositioning step.

* * * * *

REEXAMINATION CERTIFICATE (747th)
United States Patent [19]
Borzym

[11] B2 4,108,029
[45] Certificate Issued  Aug. 18, 1987

[54] CUT-OFF DIE SET

[75] Inventor: Alexander Borzym, Dearborn, Mich.

[73] Assignee: Alpha Industries, Inc., Dearborn, Mich.

Reexamination Request:
 No. 90/000,682, Dec. 10, 1984

Reexamination Certificate for:
 Patent No.: 4,108,029
 Issued: Aug. 22, 1978
 Appl. No.: 799,205
 Filed: May 23, 1977

Reexamination Certificate B1 4,108,029 issued Jan. 1, 1985.

Disclaimer of claim 12 filed: May 4, 1983
 (1032 O.G. 14)

[51] Int. Cl.⁴ .......................... B26D 1/56; B26D 3/16
[52] U.S. Cl. .......................................... 83/54; 83/300;
        83/310; 83/319; 83/578; 83/917; 83/385
[58] Field of Search ...................... 83/34, 54, 300, 310,
        83/319, 385, 454, 456, 578, 618, 697, 917, 926
        H, 169

[56]  References Cited
    U.S. PATENT DOCUMENTS

| | | | |
|---|---|---|---|
| 2,741,309 | 4/1956 | Czarnik | 164/49 |
| 2,879,844 | 3/1959 | Tuttle | 83/384 X |
| 3,129,624 | 4/1964 | Auer | 83/300 |
| 3,938,415 | 2/1976 | Borzym | 83/385 |
| 4,036,091 | 7/1977 | Borzym | 83/319 |

OTHER PUBLICATIONS

"The Vogel Tool & Die catalog" by Vogel Tool & Die Corp. publ. Mar., 1968, see p. 8, thereof relating to cut-off Die at upper right of page and literature of Feb. 1962.

*Primary Examiner*—Willie G. Abercrombie

[57]  ABSTRACT

A cut-off die set is disclosed for use in a cut-off apparatus of the type in which continuous length of tubing or other elongated stock emanating from a tubing mill is severed into lengths as the tubing emanates from the tubing mill by means of a cut-off die set mounted within the cut-off apparatus. The cut-off die set is adapted to be clamped to the tube so as to move therewith during severing of the tubing by a ram operated cut-off blade descending vertically to shear the tubing. The present disclosure involves a improvement to a notching mechanism often included in such cut-off apparatus in which a horizontally reciprocated blade notches the upper portion of the tubing just prior to severing by the main cut-off blade so as to eliminate dimples in the severed tube cross section. The improvement lies in a different timing of the movement of the notching blade with respect to the motion of the main blade, coupled with a different configuration thereof, the improved notching mechanism consisting of a notching blade having a hook shaped cutting edge which is pulled from an initial position extending over the tube across the upper portion of the tubing in order to notch the same, with the notching blade returning to its initial position after severing by passing through the opening in the tube created by the main cut-off blade. This drastically reduces the velocity of the notching blade operating mechanism, improving wear on the blade and other movement parts as well as reducing the loads on the operating mechanism. In addition it eliminates the blade drag normally associated with withdrawal of the notching blade prior to severing of the tubing section as occurs in conventional designs.

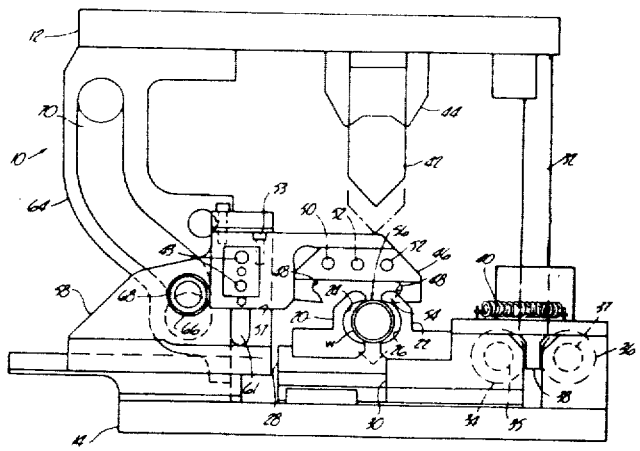

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 4 was previously cancelled.

Claim 12 was previously disclaimed.

Claim 7 and 8 are cancelled.

Claims 1, 6 and 13 are determined to be patentable as amended.

Claims 2, 3, 5, 9–11 and 14–16, dependent on an amended claim, are determined to be patentable.

New claim 17 is added and determined to be patentable.

1. A cut-off die set for use in an elongated stock cut-off apparatus of the type including a ram mechanism for operating said cut-off die set, said die set comprising [:] *as an integrated combination which is removable as a unit from said cut-off apparatus:*
   an upper die shoe;
   a lower die shoe;
   guide means interconnecting the upper and lower shoes for reciprocal motion therebetween;
   clamping means comprising a pair of clamping jaws on said lower shoe; cam means depending from said upper shoe for directly and positively actuating said jaws as a result of motion of said upper shoe relative to said lower shoe for clamping said die set to said stock;
   a main cut-off blade, carried by said upper shoe to sever said stock after said clamping means clamps said die set to said stock;
   notching means for notching said stock periphery prior to said severing by said main cut-off blade at the point on said stock at which said severing is initiated said notching means including:
   a notching blade, slide means for reciprocally drawing said notching blade from an initial position through a notching stroke across said stock prior to said severing of said stock by said main cut-off blade and returning said notching blade to said initial position through the same path as the notching stroke and normally without change in attitude after said main cut-off blade has severed said stock at said notching point, and *actuating* means mechanically connecting said slide means to said upper shoe for positively driving the slide means only in the notching stroke direction as the upper shoe descends towards said lower shoe for positively driving the slide means only in the return direction as the upper shoe ascends reciprocally away from said lower shoe [,], *said cam means,* said slide means and said actuating means, in combination, simultaneously initiating operation of said clamping means, said main cut-off blade and said notching means in response to reciprocation of said upper die shoe toward said lower die shoe by said ram mechanism.

6. The die set according to claim 5 wherein said [means for reciprocating said cross slide] *actuating means* includes a cam and cam follower connected respectively to said upper die shoe and said lower die shoe causing said transverse reciprocation of said cross slide.

13. A method of severing lengths of elongated stock such as tubing in a movable independent die set comprising relatively reciprocal upper and lower die components wherein the upper component carries a cut-off blade and the lower component carries a pair of clamping jaws for said stock comprising the steps of:
   positioning a notching blade on a cross slide which extends across the stock between the upper and lower die components;
   powering the upper component toward the lower component;
   *simultaneously* driving the cross slide across the periphery of the stock directly from movement of the upper component so that the notching blade cuts a notch in the periphery of the stock and clears the path of the cut-off blade as the cut-off blade enters the plans of notching blade cross slide movement;
   simultaneously positively driving the clamping jaws directly off the upper die component;
   powering the upper component away from the lower component;
   unclamping the stock; and
   repositioning the notching blade by simultaneously powering the cross slide off of the upper component back toward the initial position where in said repositioning step, said notching blade is passed through the opening between said severed stock lengths created by said cut-off blade, whereby said notching blade does not contact said stock during said repositioning step.

*17. A cut-off die set for use in an elongated stock cut-off apparatus of the type including a ram mechanism for operating said cut-off die set, said die set comprising as an integrated combination which is removable as a unit from said cut-off apparatus:*
   *clamping means adapted to be operated by said ram mechanism clamping said die set to said stock;*
   *a main cut-off blade, and means operated by said ram mechanism causing said main cut-off blade to move to sever said stock as said clamping means clamps said die set to said stock;*
   *notching means for notching said stock periphery prior to said severing by said main cut-off blade at the point on said stock at which said severing is initiated, said notching means including:*
   *a notching blade, means producing notching of said stock by drawing said notching blade across said stock prior to said severing of said stock by said main cut-off blade;*
   *means repositioning said notching blade in said initial position after said main cut-off blade has severed said stock at said notching point, whereby said notching and return strokes of said notching blade occur before and after, respectively, said severing movement of said main cut-off blade;*

*wherein said die set includes an upper die shoe adapted to be drivingly connected to said ram mechanism and a lower shoe mounted stationary relative to said upper die shoe, whereby said upper die shoe is reciprocated toward said lower die shoe; and*

*means for simultaneously initiating operation of said clamping means and said main cut-off blade and said notching means in response to said reciprocation of said upper die shoe toward said lower die shoe by said ram mechanism,*

*said notching means further including a cross slide member and means for reciprocating said cross slide member across the axis of said stock and said clamping means,*

*wherein said means for reciprocating said cross slide includes a cam and a cam follower interconnecting said upper die shoe and said cross slide and causing transverse reciprocation of said cross slide,*

*wherein said cam and said cam follower are configured to produce reciprocation of said cross slide to cause said notching blade to extend across said stock immediately prior to release of said clamping means by reciprocation of said upper die shoe and lower die shoe to their extrememost position;*

*said main cut-off blade being mounted in a holder carried by said upper shoe, the notching blade and the holder being matingly configured so as to prevent interference therebetween in the respective positions occupied thereby when the upper die shoe is fully displaced toward the lower die shoe.*

\* \* \* \* \*